(12) United States Patent
Chen et al.

(10) Patent No.: US 8,029,143 B2
(45) Date of Patent: Oct. 4, 2011

(54) ILLUMINATION SYSTEM

(75) Inventors: Mei-Ling Chen, Hsinchu (TW); S-Wei Chen, Hsinchu (TW); Chao-Shun Chen, Hsinchu (TW); Hung-Cheng Lung, Hsinchu (TW); Chun-Fa Hsu, Hsinchu (TW); Cheng-Shun Liao, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 680 days.

(21) Appl. No.: 11/954,687

(22) Filed: Dec. 12, 2007

(65) Prior Publication Data

US 2008/0316569 A1 Dec. 25, 2008

(30) Foreign Application Priority Data

Jun. 23, 2007 (TW) ................................ 96210233 U

(51) Int. Cl.
*G03B 21/00* (2006.01)

(52) U.S. Cl. ................ 353/31; 353/30; 353/33; 353/34; 353/37; 353/94; 353/95; 353/84; 349/5; 349/6; 349/7; 349/8; 359/710

(58) Field of Classification Search .................... 353/30, 353/31, 34, 94, 95, 37, 84, 33; 348/742, 348/743, 771; 359/708, 710, 720, 709, 711, 359/712, 713, 714, 715, 716, 717, 718; 385/133, 385/901; 349/5, 6, 7, 8
See application file for complete search history.

(56) References Cited

U.S. PATENT DOCUMENTS

| | | | |
|---|---|---|---|
| 5,442,414 A * | 8/1995 | Janssen et al. | 353/98 |
| 6,144,420 A * | 11/2000 | Jung | 349/8 |
| 6,464,363 B1 * | 10/2002 | Nishioka et al. | 359/846 |
| 6,923,544 B2 | 8/2005 | Ito | |
| 7,125,120 B2 * | 10/2006 | Aruga | 353/20 |
| 7,125,123 B2 * | 10/2006 | Kwon et al. | 353/84 |
| 7,178,920 B2 * | 2/2007 | Ishikura et al. | 353/81 |
| 7,355,800 B2 * | 4/2008 | Anikitchev | 359/710 |
| 7,611,247 B2 * | 11/2009 | Penn et al. | 353/97 |
| 2002/0085180 A1 * | 7/2002 | Lee | 353/84 |
| 2004/0263793 A1 * | 12/2004 | Kim et al. | 353/33 |
| 2005/0162622 A1 * | 7/2005 | Esterberg et al. | 353/84 |
| 2006/0023174 A1 * | 2/2006 | Kang et al. | 353/97 |
| 2006/0044519 A1 * | 3/2006 | Huibers et al. | 353/30 |
| 2006/0109428 A1 * | 5/2006 | Liang | 353/84 |
| 2006/0153518 A1 * | 7/2006 | Abu-Ageel | 385/146 |
| 2006/0164726 A1 * | 7/2006 | Morejon et al. | 359/495 |
| 2007/0024828 A1 * | 2/2007 | Liao et al. | 353/122 |
| 2009/0015938 A1 * | 1/2009 | Harada | 359/676 |

* cited by examiner

*Primary Examiner* — Georgia Y Epps
*Assistant Examiner* — Sultan Chowdhury
(74) *Attorney, Agent, or Firm* — J.C. Patents

(57) ABSTRACT

An illumination system for providing an illumination beam to a light valve is provided. The illumination system includes a light source, a light integration rod, a color wheel, a first focusing unit and a second focusing unit. The light source is capable of generating the illumination beam, and the light integration rod is disposed on the transmission path of the illumination beam. The first focusing unit is disposed between the integration rod and the color wheel and is capable of focusing the illumination beam onto the color wheel. The second focusing unit is disposed between the color wheel and the light valve and is capable of focusing the illumination beam onto the light valve.

15 Claims, 5 Drawing Sheets

ILLUMINATION SYSTEM

CROSS-REFERENCE TO RELATED APPLICATION

This application claims the priority benefit of Taiwan application serial no. 96210233, filed on Jun. 23, 2007. The entirety of the above-mentioned patent application is hereby incorporated by reference herein and made a part of this specification.

BACKGROUND OF THE INVENTION

1. Field of the Invention

The present invention generally relates to an illumination system and more particularly to an illumination system for a projection apparatus.

2. Description of Relative Art

Referring to FIG. 1, an illumination system 100 of a conventional liquid crystal on silicon (LCOS) projection apparatus adopting scrolling color recapture (SCR) technology includes a light source 110, a light integration rod (LIR) 120, a color wheel 130, a polarization conversion system (PCS) 140 and a relay lens group 150. The relay lens group 150 includes a plurality of lenses 152, 154 and 156. In addition, the light source 110 is for providing an illumination beam 112 which passes through the LIR 120 and the color wheel 130, followed by being focused to an LCOS panel 50 by the relay lens group 150. The PCS 140 is disposed between the lens 152 and the lens 156, so as to convert the illumination beam 112 into a beam with the same polarization state.

In the prior art, the color wheel 130 is disposed between the LIR 120 and the relay lens group 150. However limited by the mechanism, the color wheel 130 and a light output end 124 of the LIR 120 are unable to be disposed on the object plane of the relay lens group 150, which leads to edge blur problem of a light spot on the LCOS panel 50.

Referring to FIG. 2, generally, considering the system tolerance, an ideal light spot 32 has a size slightly larger than the size of the LCOS panel 50. In fact, a light spot (as shown by the light spot 34) with blur edges is generated. The edges of the light spot 34 may fall on the LCOS panel 50 to cause that the illumination beam 112 is received by the LCOS panel 50 nonuniformly, which degrades the projection imaging quality. In the prior art, in order to avoid the edges of the light spot 36 from falling on the LCOS panel 50, the light spot size is increased (as shown by the light spot 36 in FIG. 2). However, the overfill ratio of the light spot 36 with respect to the LCOS panel 50 in the case is higher, which lowers the light utilization efficiency and the brightness of the projection images.

Referring to FIGS. 1 and 3A, the notation 38 of FIG. 3A represents a light spot formed by the illumination beam projected on the color wheel 130. The color wheel 130 is composed of multiple filters 132 with different colors. During the period from time T1 at which the boundary 133 between two adjacent filters 132 is passing the left end of a horizontal line 39a of the light spot 38 to time T2 at which the boundary 133 is passing the right end of the horizontal line 39a, the horizontal line 39a falls on two filters 132 with two different colors, such that the light with two different colors is transmitted away from the color wheel 130 to the LCOS panel 50, which causes a color mess and affects the color quality of the images. To avoid the color mess, the LCOS panel 50 usually stops image processing during the period from time T1 to time T2, which leads to a loss of image luminance.

Referring to FIG. 3B, similar to the above described, the same problem occurs during the period from time T3 at which the boundary 133 is passing through the right end of another horizontal line 39b of the light spot 38 to time T4 at which the boundary 133 is passing through the left end of the horizontal line 39b.

SUMMARY OF THE INVENTION

Accordingly, the present invention is directed to an illumination system to solve the conventional problem. Other advantages of the present invention should be further indicated by the disclosures of the present invention.

To achieve one of, a part of or all of the above-mentioned advantages, or to achieve other advantages, an embodiment of the present invention provides an illumination system to provide an illumination beam to a light valve. The illumination system includes a light source, an LIR, a color wheel, a first focusing unit and a second focusing unit. The light source is for generating an illumination beam, while the LIR and the color wheel are disposed on a transmission path of the illumination beam. The first focusing unit is disposed between the LIR and the color wheel, and the first focusing unit is capable of focusing the illumination beam onto the color wheel. The second focusing unit is disposed between the color wheel and the light valve, and the second focusing unit is capable of focusing the illumination beam onto the light valve.

Another embodiment of the present invention provides an illumination system for providing an illumination beam to a light valve. The illumination system includes a light source, an LIR, a color wheel and a focusing unit. The light source is for generating an illumination beam, while the LIR is disposed on a transmission path of the illumination beam, and the section of a light output end of the LIR is trapezoidal. The color wheel is disposed beside the light output end, and the focusing unit is disposed between the light valve and the color wheel, and the focusing unit is capable of focusing the illumination beam onto the light valve. The illumination beam is transmitted to the light valve along an optical axis of the illumination beam. The optical axis of the illumination beam has an included angle relative to a normal vector of an active surface of the light valve. The included angle is greater than 0° but less than 90°.

In the illumination system, the light output end of the LIR is disposed on the object plane of the first focusing unit, and the color wheel is disposed on the object plane of the second focusing unit, and the imaging plane of the first focusing unit and the object plane of the second focusing unit are superposed with each other. Thus, the illumination beam is projected onto the light valve to form a sharp light spot. Besides, in the illumination system, the section of the light output end of the LIR is designed to be trapezoidal, so that the corresponding light spot formed by the illumination beam projected on the color wheel is trapezoidal as well, which increases the image processing time of the light valve.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The above-described and other technical descriptions, the features and the functions of the present invention are clearly presented in association of the detail depiction of an embodiment with the accompanying figures. In the following, the depicted embodiments together with the included drawings are intended to explain the feasibility of the present invention, wherein some of expression words regarding direction or orientation, such as 'upper', 'lower', 'front', 'behind', 'left', 'right' and the like, are to describe, not to limit, the present invention.

The First Embodiment

Figure 1:
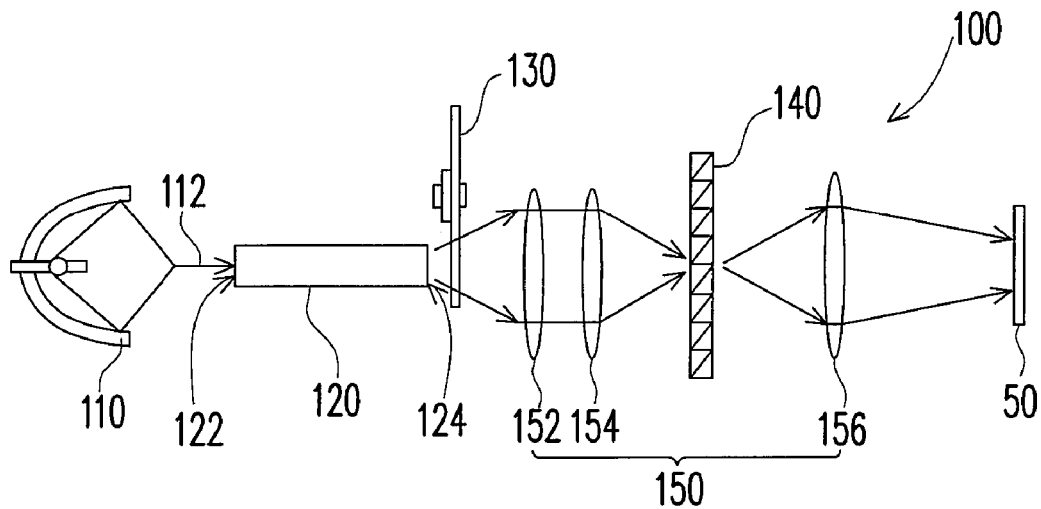
FIG. 1 is a diagram of a conventional illumination system.
Figure 2:
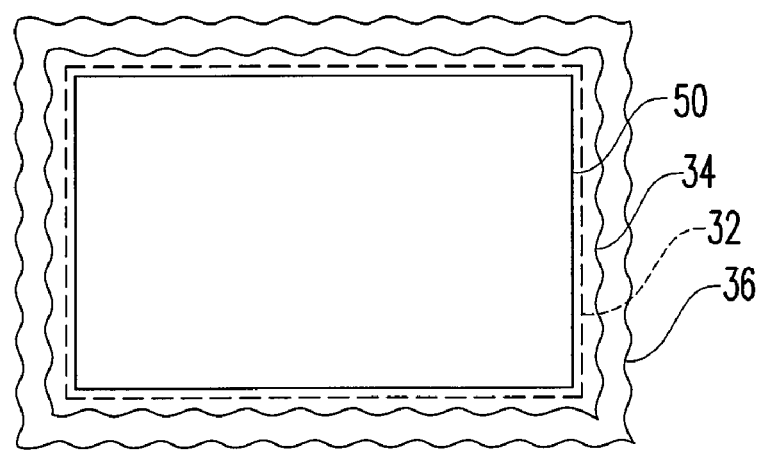
FIG. 2 is a diagram showing a light spot projected onto a liquid crystal on silicon panel (LCOS panel) according to the prior art.
Figure 3A:
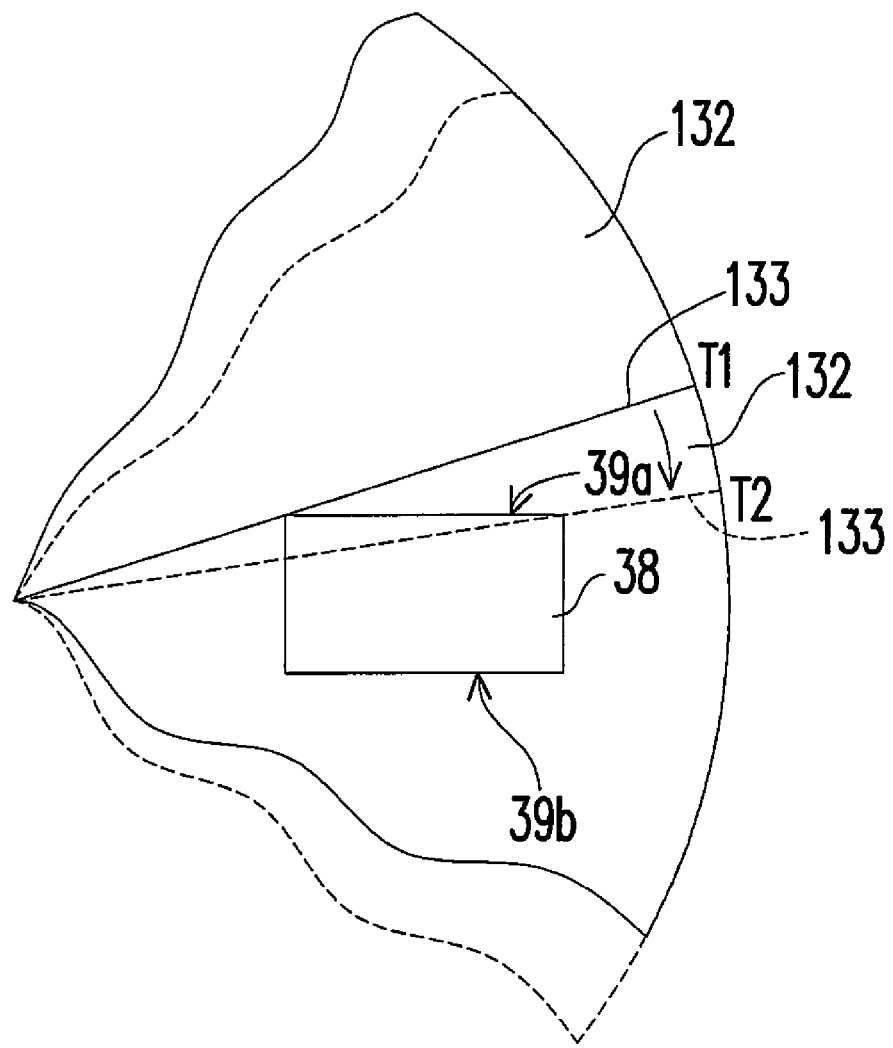
FIGS. 3A and 3B are diagrams showing a light spot projected onto a rotating color wheel according to the prior art.
Figure 3B:
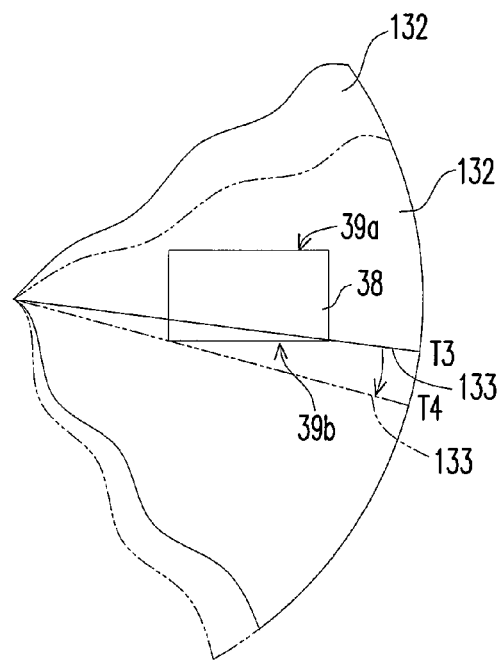
Figure 4:
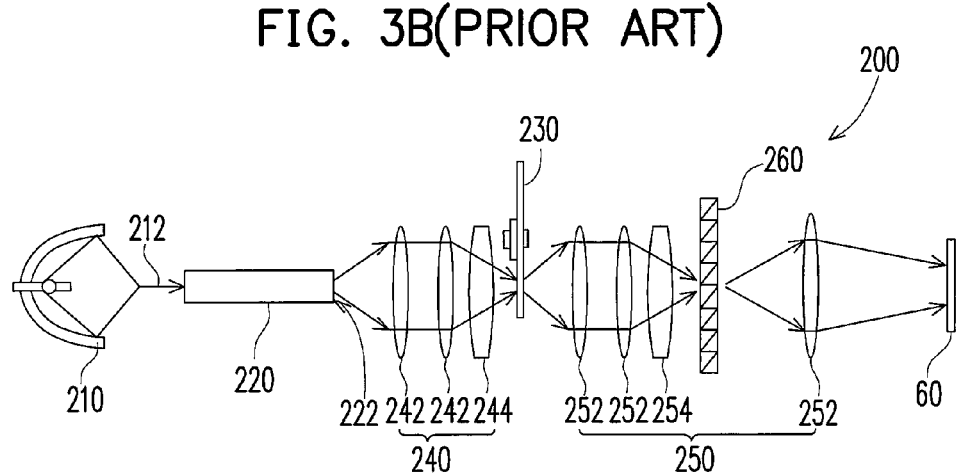
FIG. 4 is a diagram of an illumination system according to a first embodiment of the present invention.

FIG. 4 is a diagram of an illumination system according to a first embodiment of the present invention. Referring to FIG. 4, an illumination system 200 of the present embodiment is for providing an illumination beam 212 to a light valve 60. The illumination system 200 includes a light source 210, a light integration rod (LIR) 220, a color wheel 230, a first focusing unit 240 and a second focusing unit 250. The light source 210 is for providing the illumination beam 212, while the LIR 220 is disposed on a transmission path of the illumination beam 212. The first focusing unit 240 is disposed between the LIR 220 and the color wheel 230, and the first focusing unit 240 is capable of focusing the illumination beam 212 onto the color wheel 230. The second focusing unit 250 is disposed between the color wheel 230 and the light valve 60, and the second focusing unit 250 is capable of focusing the illumination beam 212 onto the light valve 60.

In more detail, the first focusing unit 240 includes at least a lens 242 and the second focusing unit 250 includes at least a lens 252. In addition, a light output end 222 of the LIR 220 is disposed on the object plane of the first focusing unit 240, while the color wheel 230 is disposed on the imaging plane of the first focusing unit 240. The object plane of the second focusing unit 250 and the imaging plane of the first focusing unit 240 are superposed with each other, while the light valve 60 is disposed on the imaging plane of the second focusing unit 250. The light valve 60 is, for example, a conventional liquid crystal on silicon (LCOS) panel. The illumination system 200 may further include a polarization conversion system (PCS) 260 disposed between the lenses 252 of the second focusing unit 250.

Since the light output end 222 of the LIR 220 and the color wheel 230 are respectively located on the object plane and the imaging plane of the first focusing unit 240, the first focusing unit 240 sharply focuses the illumination beam 212 passing through the light output end 222 onto the color wheel 230. In addition, since the color wheel 230 and the light valve 60 are respectively located on the object plane and the imaging plane of the second focusing unit 250, the second focusing unit 250 sharply focuses the illumination beam 212 passing through the color wheel 230 onto the light valve 60. In this way, the edge blur problem of the light spot formed by the illumination beam 212 projected onto the light valve 60 is avoided.

Compared to the prior art, since the present embodiment avoids the edge blur problem of the light spot on the light valve 60, there is no need to increase the overfill ratio of the light spot 60 with respect to the light valve 60. In other words, the illumination system 200 of the present embodiment has higher light utilization efficiency, so as to promote the image brightness provided by the projection apparatus. The present embodiment may also shrink the light spot formed by the illumination beam 212 projected onto the color wheel 230 by adjusting the magnification of the first focusing unit 240, such the color wheel 230 with a small size may be used, so as to reduce the cost of the color wheel 230.

Figure 5:
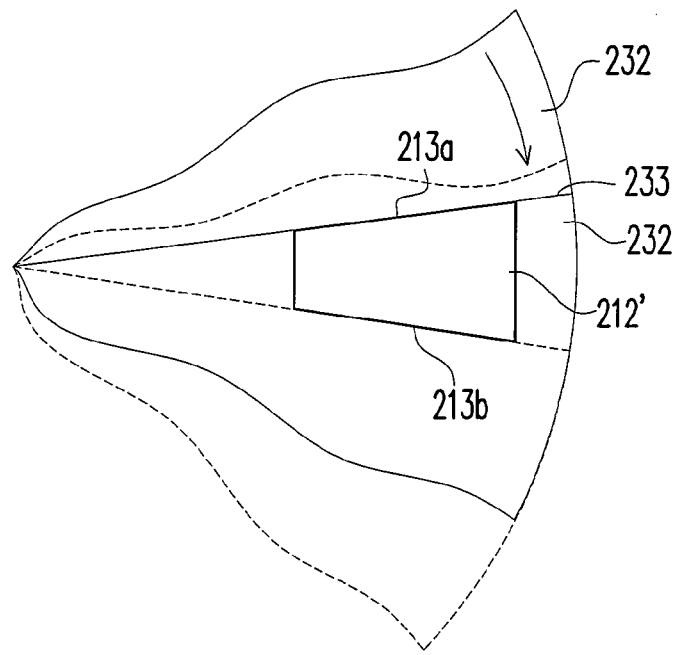
FIG. 5 is a diagram showing a light spot projected onto a color wheel according to the first embodiment of the present invention.

In order to prolong the image processing time conducted by the light valve 60, at least an asymmetric cylindrical lens 244 and an asymmetric cylindrical lens 254 are respectively added in the first focusing unit 240 and the second focusing unit 250 in the present invention, and the asymmetric cylindrical lenses 244 and 254 are off-center lenses. Since the section of the light output end 222 of the LIR 220 is rectangular, the light spot 212' (as shown in FIG. 5) formed by the illumination beam 212 projected onto the color wheel 230 is adjusted into a trapezoidal light spot by means of the asymmetric cylindrical lens 244 in the first focusing unit 240. In this way, the boundary 233 between any two adjacent filters 232 of the color wheel 230 is able to simultaneously pass both ends of the sideline 213a of the light spot 212'. Therefore, the sideline 213a is prevented from getting two kinds of light with different colors simultaneously, which shortens the time for the light valve 60 not to conduct image processing and promotes the image brightness accordingly. In addition, the asymmetric cylindrical lens 254 in the second focusing unit 250 is for adjusting the shape of the light spot 212', so as to make the light spot on the light valve 60 be a rectangular light spot.

Except for making the light spot 212' have a trapezoidal shape by means of the asymmetric cylindrical lens 244 in the first focusing unit 240, the present invention may also make the section of the light output end 222 of the LIR 220 have a trapezoidal shape, so as to generate a trapezoidal light spot 212'. Furthermore, besides adjusting a trapezoidal light spot into a rectangle light spot by means of the asymmetric cylindrical lens 254 in the second focusing unit 250, the present invention proposes making the light spot on the light valve 60 be a rectangle light spot by making the illumination beam 212 obliquely incident upon the light valve 60, as will be described in detail hereinafter.

Figure 6:
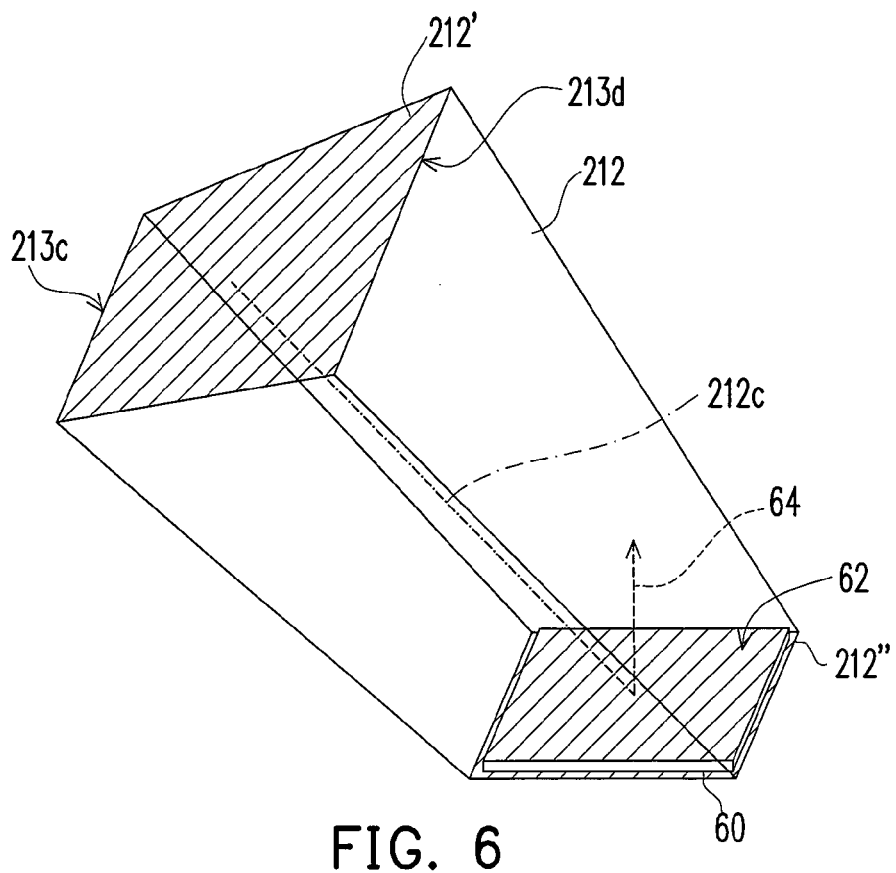
FIG. 6 is a diagram showing an illumination beam obliquely incident upon a light valve according to the first embodiment of the present invention.

Referring to FIG. 6, the illumination beam 212 is obliquely incident upon the light valve 60. The illumination beam 212 is transmitted to the light valve 60 along an optical axis 212c of the illumination beam 212. The optical axis 212c of the illumination beam 212 has an included angle relative to the normal vector 64 of the active surface 62 of the light valve 60, and the included angle is greater than 0° but less than 90°. In addition, the shorter sideline of two parallel sidelines 213c and 213d of the trapezoidal light spot 212' is the sideline 213c. Since the illumination beam 212 is gradually converged at the light valve 60, the shape of the light spot 212" formed by the illumination beam 212 projected onto the light valve 60 is adjusted into a rectangular light spot by making the transmission path corresponding to the portion of the light spot 212' closer to the sideline 213c be shorter than the transmission path corresponding to the portion of the light spot 212' closer to the sideline 213d.

The Second Embodiment

Figure 7:
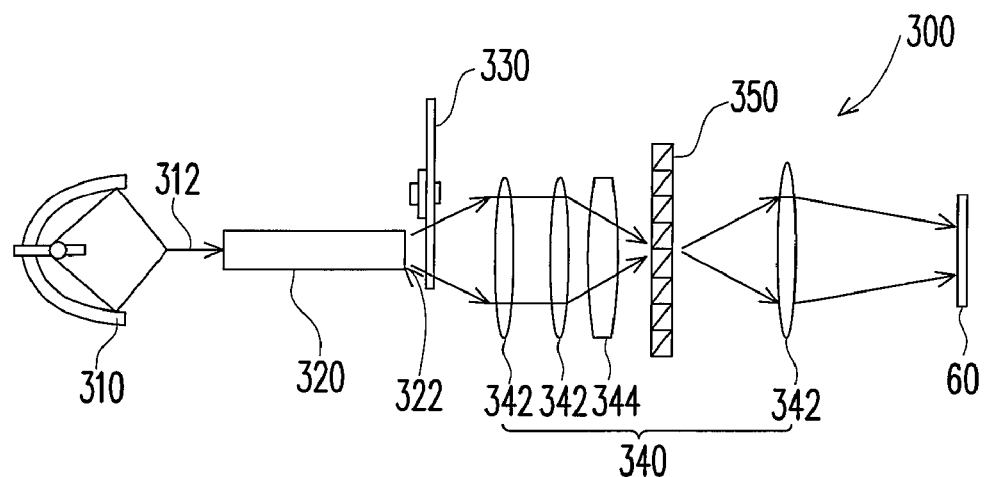
FIG. 7 is a diagram of an illumination system according to a second embodiment of the present invention.

Referring to FIG. 7, an illumination system 300 according to a second embodiment of the present invention is for providing an illumination beam 312 to a light valve 60. The illumination system 300 includes a light source 310, an LIR 320, a color wheel 330 and a focusing unit 340. The light source 310 is for providing the illumination beam 312, while the LIR 320 is disposed on a transmission path of the illumination beam 312, and the section of a light output end 322 of the LIR 320 is trapezoidal. The color wheel 330 is disposed beside the light output end 322. The focusing unit 340 is disposed between the color wheel 330 and the light valve 60, and the focusing unit 340 is capable of focusing the illumination beam 312 onto the light valve 60. In more detail, the focusing unit 340 includes at least a lens 342, so as to focus the illumination beam 312 onto the light valve 60. In addition, the focusing unit 340 further includes at least an asymmetric cylindrical lens 344, and the asymmetric cylindrical lens 344 is an off-center lens.

The light valve 60 is, for example, an LCOS panel. The illumination system 300 may further include a PCS 350 disposed between the focusing unit 340 and the lens 342.

Similar to the first embodiment, since the section of the light output end 322 is trapezoidal, the light spot formed by the illumination beam 312 projected onto the color wheel 330 is also adjusted into a trapezoidal light spot, which shortens the time for the light valve 60 not to conduct image processing and promotes the image brightness accordingly. In addition, the asymmetric cylindrical lens 344 in the focusing unit 340 is capable of adjusting the shape of the light spot, so as to make the light spot on the light valve 60 be a rectangular light spot.

The Third Embodiment

Figure 8:
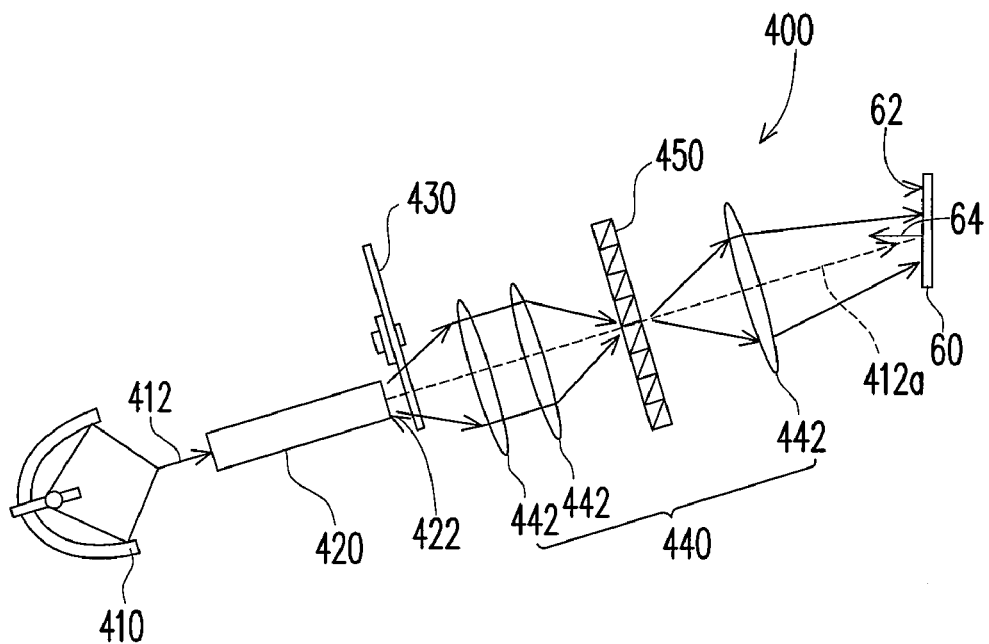
FIG. 8 is a diagram of an illumination system according to a third embodiment of the present invention.

Referring to FIG. 8, an illumination system 400 according to a third embodiment is for providing an illumination beam 412 to a light valve 60. The illumination system 400 includes a light source 410, an LIR 420, a color wheel 430 and a focusing unit 440. The light source 410 is for providing the illumination beam 412, while the LIR 420 is disposed on a transmission path of the illumination beam 412, and the section of a light output end 422 of the LIR 420 is trapezoidal. The color wheel 430 is disposed beside the light output end 422, and the focusing unit 440 is disposed between the LIR 420 and the color wheel 430. The focusing unit 440 is capable of focusing the illumination beam 412 onto the light valve 60. In more detail, the focusing unit 440 includes at least a lens 442, so as to focus the illumination beam 412 onto the light valve 60. In addition, the illumination beam 412 is transmitted to the light valve 60 along an optical axis 412a of the illumination beam 412. The optical axis 412a of the illumination beam 412 has an included angle relative to the normal vector 64 of the active surface 62 of the light valve 60, and the included angle is greater than 0° but less than 90°. In other words, the illumination beam 412 is obliquely incident upon the light valve 60.

The light valve 60 is, for example, an LCOS panel. The illumination system 400 may further include a polarization conversion system (PCS) 450 disposed between the focusing unit 440 and the lens 442.

Similar to the first embodiment, since the section of the light output end 422 is trapezoidal, the light spot formed by the illumination beam 412 projected onto the color wheel 430 is also adjusted into a trapezoidal light spot, which shortens the time for the light valve 60 not to conduct image processing and promotes the image brightness accordingly. In addition, the illumination beam 412 is obliquely incident upon the light valve 60, which makes the light spot formed by the illumination beam 412 projected onto the light valve 60 be a rectangular light spot.

In summary, the present invention has at least one or more of the following advantages:

1. In the first embodiment, the light output end of the LIR is disposed on the object plane of the first focusing unit, and the color wheel is disposed on the object plane of the second focusing unit, and the imaging plane of the first focusing unit and the object plane of the second focusing unit are superposed with each other, such that a sharp light spot formed by the illumination beam projected on the light valve is obtained. In addition, there is no need to increase the overfill ratio of the light spot with respect to the light valve since the light spot on the light valve is sharp. Accordingly, the illumination system of the present invention has higher light utilization efficiency.

2. By adjusting the magnification of the first focusing unit, the light spot formed by the illumination beam projected on the color wheel is shrunk, which allows manufacturer to use a color wheel with a smaller size to reduce the cost of the color wheel.

3. Since the section of the light output end of the LIR is designed to be trapezoidal, the light spot formed by the illumination beam projected on the color wheel is trapezoidal as well, which increases the time for the light valve to conduct image processing and promotes the image brightness accordingly.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claim.

What is claimed is:

1. An illumination system, for providing an illumination beam to a light valve, the illumination system comprising:
   a light source, for generating the illumination beam;
   a light integration rod, disposed on a transmission path of the illumination beam;
   a color wheel, disposed on the transmission path of the illumination beam and comprising a plurality of color filters;
   a first focusing unit, disposed between the light integration rod and the color wheel and located on the transmission path of the illumination beam, the first focusing unit being capable of focusing the illumination beam onto the color wheel; and
   a second focusing unit, disposed between the color wheel and the light valve and located on the transmission path of the illumination beam, the second focusing unit being capable of focusing the illumination beam onto the light valve, wherein a light output end of the light integration rod is disposed on an object plane of the first focusing unit, while the color wheel is disposed on an imaging plane of the first focusing unit, and an object plane of the second focusing unit and the imaging plane of the first focusing unit are superposed with each other, while the light valve is disposed on an imaging plane of the second focusing unit.

2. The illumination system according to claim 1, wherein a cross-section of a light output end of the light integration rod is rectangular, each of the first focusing unit and the second focusing unit comprises at least an asymmetric cylindrical lens, and the asymmetric cylindrical lens is an off-center lens.

3. The illumination system according to claim 1, wherein a cross-section of a light output end of the light integration rod is trapezoidal, the second focusing unit comprises at least an asymmetric cylindrical lens, and the asymmetric cylindrical lens is an off-center lens.

4. The illumination system according to claim 1, wherein a cross-section of a light output end of the light integration rod is rectangular, the first focusing unit comprises at least an asymmetric cylindrical lens, the asymmetric cylindrical lens is an off-center lens, the illumination beam is transmitted to the light valve along an optical axis of the illumination beam, the optical axis of the illumination beam has an included angle relative to a normal vector of an active surface of the light valve, and the included angle is greater than 0° but less than 90°.

5. The illumination system according to claim 1, wherein a cross-section of a light output end of the light integration rod is trapezoidal, the illumination beam is transmitted to the light valve along an optical axis of the illumination beam, the optical axis of the illumination beam has an included angle relative to a normal vector of an active surface of the light valve, and the included angle is greater than 0° but less than 90°.

6. The illumination system according to claim 1, wherein the first focusing unit comprises at least a lens.

7. The illumination system according to claim 1, wherein the second focusing unit comprises at least a lens.

8. The illumination system according to claim 1, further comprising a polarization conversion system disposed between the color wheel and the light valve.

9. An illumination system, for providing an illumination beam to a light valve, the illumination system comprising:
   a light source, for generating the illumination beam;
   a light integration rod, disposed on a transmission path of the illumination beam, a cross-section of a light output end of the light integration rod being trapezoidal;
   a color wheel, disposed on the transmission path of the illumination beam and comprising a plurality of color filters;
   a first focusing unit, disposed between the light integration rod and the color wheel and located on the transmission path of the illumination beam, the first focusing unit being capable of focusing the illumination beam onto the color wheel; and
   a second focusing unit, disposed between the color wheel and the light valve and located on the transmission path of the illumination beam, the second focusing unit being capable of focusing the illumination beam onto the light valve, wherein a light output end of the light integration rod is disposed on an object plane of the first focusing unit, while the color wheel is disposed on an imaging plane of the first focusing unit, and an object plane of the second focusing unit and the imaging plane of the first focusing unit are superposed with each other, while the light valve is disposed on an imaging plane of the second focusing unit.

10. The illumination system according to claim 9, wherein the illumination beam is transmitted to the light valve along an optical axis of the illumination beam, the optical axis of the illumination beam has an included angle relative to a normal vector of an active surface of the light valve, and the included angle is greater than 0° but less than 90°.

11. The illumination system according to claim 10, wherein the second focusing unit comprises at least an asymmetric cylindrical lens, and the asymmetric cylindrical lens is an off-center lens.

12. The illumination system according to claim 9, further comprising a polarization conversion system disposed between the color wheel and the light valve.

13. An illumination system, for providing an illumination beam to a light valve, the illumination system comprising:
   a light source, for generating the illumination beam;
   a light integration rod, disposed on a transmission path of the illumination beam, a cross-section of a light output end of the light integration rod being trapezoidal;
   a color wheel, disposed on the transmission path of the illumination beam and adjacent to the light output end of the light integration rod, wherein the illumination beam from the light integration rod immediately strikes the color wheel;
   a focusing unit, disposed between the color wheel and the light valve and located on the transmission path of the illumination beam, the focusing unit being capable of focusing the illumination beam onto the color wheel, wherein the light output end of the light integration rod is disposed on an object plane of the focusing unit, while the color wheel is disposed on an imaging plane of the focusing unit, the focusing unit directly transmits the illumination beam to the color wheel without passing through another optical element, the illumination beam being transmitted to the light valve along an optical axis of the illumination beam, the optical axis of the illumination beam having an included angle relative to a normal vector of an active surface of the light valve, and the included angle being greater than 0° but less than 90°.

14. The illumination system according to claim 13, wherein the focusing unit further comprises at least a lens.

15. The illumination system according to claim 13, further comprising a polarization conversion system disposed between the color wheel and the light valve.

* * * * *